(12) United States Patent  (10) Patent No.: US 7,731,013 B2
Milner et al.  (45) Date of Patent: Jun. 8, 2010

(54) MECHANICAL WORKSTATION SKILLET LIFT

(75) Inventors: John D. Milner, Shelby Township, MI (US); Thomas E. Heinemeier, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 186 days.

(21) Appl. No.: 12/038,240

(22) Filed: Feb. 27, 2008

(65) Prior Publication Data

US 2009/0211879 A1   Aug. 27, 2009

(51) Int. Cl.
   *B65G 15/58*   (2006.01)
(52) U.S. Cl. .................. 198/468.6; 198/463.3
(58) Field of Classification Search .............. 198/343.2, 198/345.2, 346.3, 468.6, 468.8, 463.3
   See application file for complete search history.

(56) References Cited

U.S. PATENT DOCUMENTS

| 4,305,495 | A  | * | 12/1981 | Zinke et al. | 198/346.3 |
| 4,646,915 | A  | * | 3/1987  | Ohtaki et al. | 198/346.2 |
| 4,846,623 | A  | * | 7/1989  | Otani et al. | 198/468.6 |
| 6,386,354 | B1 | * | 5/2002  | Crorey | 198/468.6 |
| 6,494,304 | B1 | * | 12/2002 | Jaynes et al. | 198/345.2 |
| 6,505,726 | B1 | * | 1/2003  | Baulier | 198/345.1 |
| 7,458,455 | B2 | * | 12/2008 | Nakamura et al. | 198/463.3 |

* cited by examiner

*Primary Examiner*—James R Bidwell
(74) *Attorney, Agent, or Firm*—Quinn Law Group, PLLC

(57) ABSTRACT

A mechanical skillet lift and conveyor system including a workstation having a lift element securely positioned at a first location and a skillet including a lift device and a vertically translatable table drivenly coupled to the device, wherein the skillet device is configured to automatically cause a predetermined change in table elevation, when the skillet is translated through the workstation such that the device engages the element.

18 Claims, 7 Drawing Sheets

MECHANICAL WORKSTATION SKILLET LIFT

BACKGROUND OF THE INVENTION

1. Technical Field

The present invention relates to workstation skillet lift systems and methods of mechanically lifting a skillet borne object, and more particularly, to a mechanical workstation skillet lift operable to autonomously convert the translation of the skillet into the controlled lifting of the object, and a conveyor system comprising the same.

2. Discussion of Prior Art

Skillet conveyor systems have long been developed to increase the efficiency of manufacture and construction in industry. Generally, these systems comprise pluralities of stationary workstations and mobile skillets (or carriers) that sequentially enter each workstation. For example, a conveyor system may require 80 to 100 active workstations in 4 to 6 lanes, and 100 to 120 skillets. The work in progress (or object) is transported together with the skillet to each station where an operator awaits to perform a task. The need to lift the object, based on the task being performed and/or the height of the operator, often necessitates the inclusion of skillet borne lifting mechanisms. A main drive system, such as a conventional side-pusher drive, is provided to propel the skillets along the conveyor path. A communication system typically including an encoded rail and a PLC configured control module on each skillet is provided, so that each workstation is able to discern the entry of a skillet into the workstation. As such, sensory technology, such as a photo-eye and reflector, is also communicatively coupled to the control module. Finally, power is distributed to each skillet through a buss rail; and collector shoes on each skillet are fed into and out of the buss rail for each production run.

With respect to the lifting mechanism, a separate drive is typically dedicated to the lift. For example, in one conventional scissor lift configuration, a skillet borne electric motor causes a longitudinal shaft to rotate. The shaft is connected to a lateral axle and configured to wind at least one belt around the axle. The belt is configured and inter-aligned with the scissor apparatus, so as to cause a linearly translatable pair of scissor legs to migrate when the belt is wound. The migration of the legs causes the apparatus and a table attached thereto to rise or descend. The motor is precisely actuated and deactivated to effect the proper lift, and as such is communicatively coupled to the control module and power buss.

It is appreciated by those of ordinary skill in the art that the inclusion of communication and sensory technology, however, adds implementation and operational costs to the overall conveyor system; and when multiplied by the number of skillets and workstations, these costs are magnified. More concernedly, when carriers are in transit or in buffer positions, they invariably carry these investments without utility. It is also appreciated that the necessary inclusion of communication and sensory requirements results in a more complex system to install and operate, and a less flexible system to modify.

Purely mechanical skillet lifts that do not rely upon an electric motor, computer actuation, or communication with the station have recently been developed to address these concerns; however, they too present operational limitations. For example, a recent type of mechanical skillet lift includes ramp and wheel engagement to effect a minimal lift. In this configuration, however, the result of moving up a ramp puts back pressure on the line of skillets through a production area, causing them to try and separate. Similarly, the translation force when on the down ramp causes the skillets to separate. As a result, the skillets are typically locked together while moving through an assembly area, which reduces process flexibility and decreases operational efficiency, and the carriers have to be unlocked for transport between lanes. Finally, the minimal lifting ranges afforded by conventional mechanical lifts are insufficient for many applications and processes.

SUMMARY OF THE INVENTION

Responsive to these concerns and limitations, the present invention concerns a mechanical workstation skillet lift system that reduces the need for communication and sensory investment through the cooperative efforts of workstation lift elements and a skillet borne lifting device.

In general, the present invention concerns an autonomous skillet lift adapted for use with a workstation and a skillet having a frame and a vertically translatable table relative to the frame. The skillet is translatable through the workstation so as to define a through-station translation. The lift includes at least one elevation adjustment element securely positioned at a first location within the workstation. The lift further includes an elevation adjustment device fixedly connected to the skillet, drivenly coupled to the table, and configured to engage the element for an engagement period during the translation. The element and device are cooperatively configured to mechanically convert the translation of the skillet into a predetermined change in table elevation during the engagement period.

The inventive system is useful for eliminating the need for a communication system to discern entry of the skillet into a workstation, and a programmable controller for operator work height control.

The invention is useful for offering automatic height adjustment at the workstations while the conveyor is moving, which eliminates the need to provide lifts through accumulation areas, and eliminates the need to communicate skillet position while in production.

The invention is useful for eliminating the need for a separate lift drive power source, as an electric motor is not included. As such, the need for a buss rail below and collector shoes on each skillet is also eliminated.

The invention is further useful for converting pre-existing force produced by the skillet translation drive into precise elevational changes within a given workstation. As such, the present invention presents a facilely implementable system that requires minimal modification to existing skillet conveyor systems.

Finally, utility of invention also includes providing greater lifting capability and ranges in comparison to prior art mechanical lift systems.

Other aspects and advantages of the present invention including a system comprising the inventive lift, and a preferred embodiments of the invention having a rack and pinion gear configuration, will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DETAILED DESCRIPTION OF THE INVENTION

Figures 1, 2:
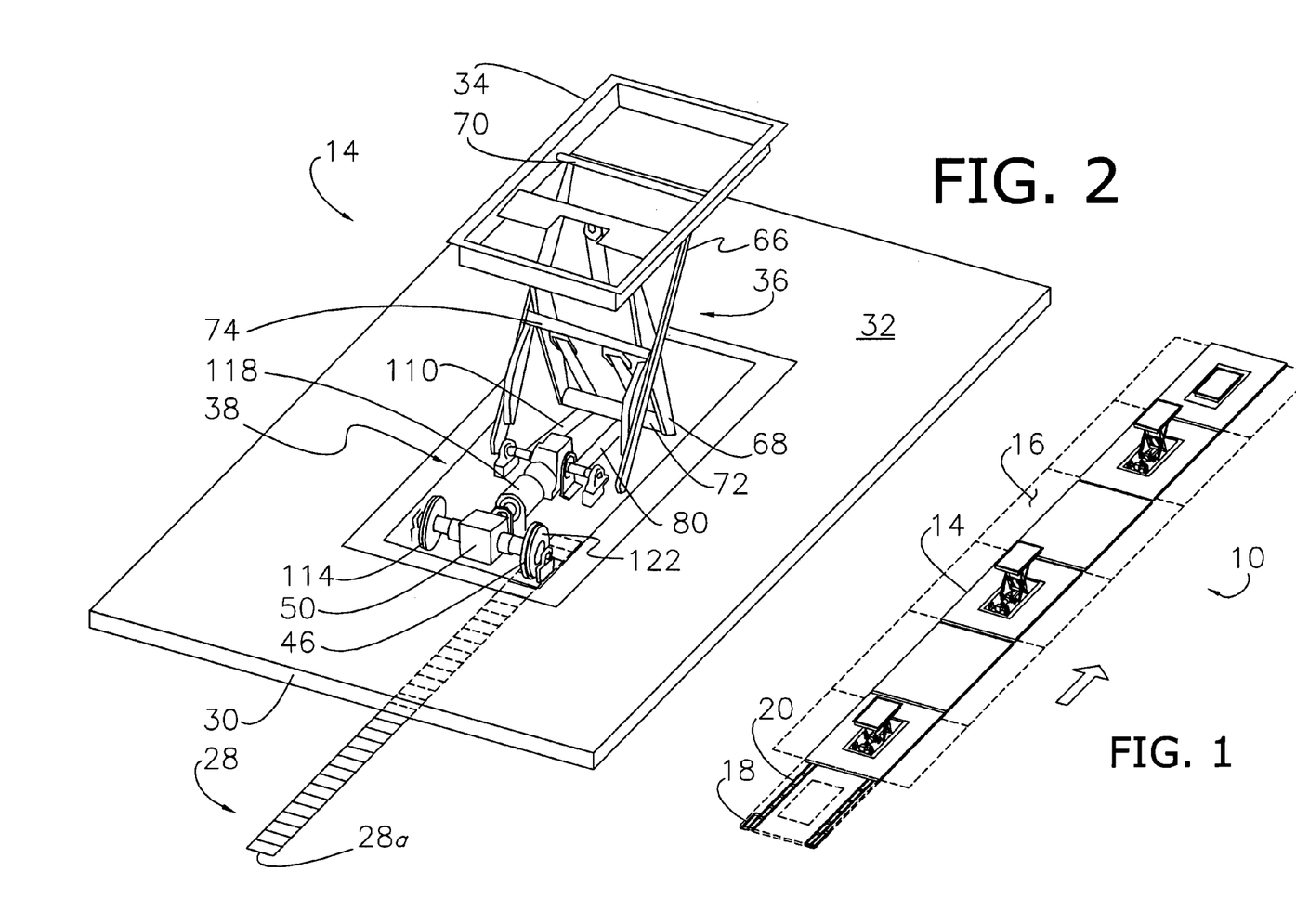
FIG. 1 is a perspective view of a skillet conveyor system segment comprising pluralities of linearly configured skillets and workstations, in accordance with a preferred embodiment of the invention.
FIG. 2 is an enlarged perspective view of a skillet and workstation lift element in accordance with a preferred embodiment of the invention, particularly illustrating a lift mechanism including a rack and pinion, belt drive, and collapsible scissor apparatus.
Figure 3:
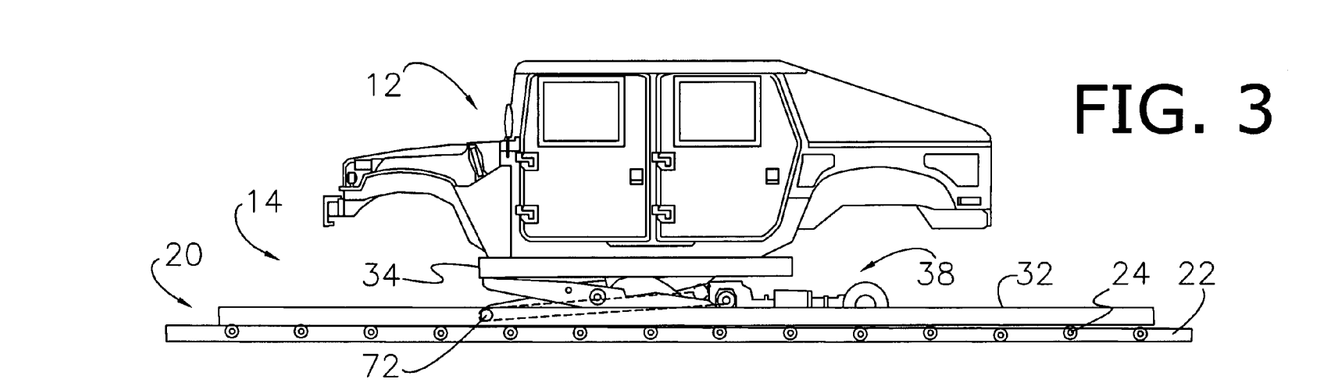
FIG. 3 is a side elevation view of a skillet in accordance with a preferred embodiment of the invention, and an object being borne thereby, particularly illustrating the lift in a collapsed condition.
Figure 4:
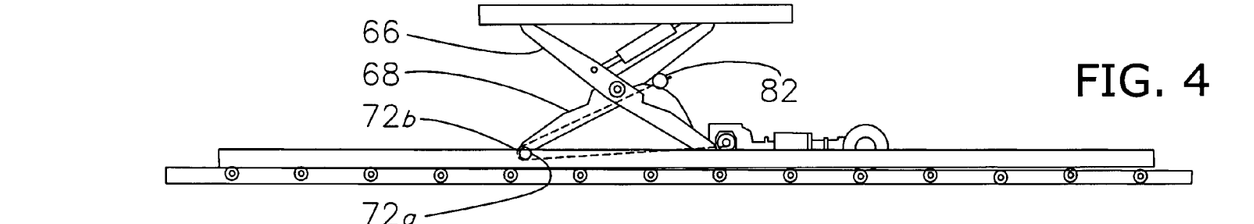
FIG. 4 is a side elevation view of the skillet shown in FIG. 3, particularly illustrating the lift in an intermediate condition.

Referring first to FIGS. 1-3, the present invention is adapted for use with a multi-elevational skillet conveyor system 10 configured to transport at least one object 12 (i.e., work-in-progress), such as a vehicle frame. The system 10 includes pluralities of skillets (or carriers) 14 and workstations 16, and a translatable drive mechanism 18 for advancing the skillets 14 from station to station. For example, the system 10 may include a conventional side-pusher drive 18 that translates the skillets 14 as part of a continuously moving assembly system. The side-pusher drive 18 provides the translation force necessary for main-line, hold-back, acceleration, deceleration, and in the present invention, lifting.

At each station 16, an operator (not shown) awaits the arrival of the skillet 14 and performs at least one task related to the transported object 12. Based on station specific parameters, such as for example, the height of the operator, the object 12 is raised or lowered to a desired elevation to facilitate performance of the task. Each workstation 16 may present a different desired elevation, such that the lift mechanism of the skillet 14 must be variably applied. The present invention concerns a novel method of effecting the autonomous and precise lifting of these objects 12 without the need for conventional communication and sensory input. That is to say, the system 10 is configured to lift the objects 12 without utilizing positioning feedback, outside actuation, or a separate power supply, as is typical with conventional electromechanical lifts.

In the illustrated embodiment, the system 10 presents an above-floor type, and more preferably, a wheels-on-floor type skillet system. As shown in FIGS. 1, 3-5, the skillets 14 preferably travel upon a plurality of rails 20, each comprising two parallel longitudinal members 22 interconnected by a plurality of equally spaced roller pins 24. The skillets 14 rest upon and are therefore spaced from the floor by the pins 24, so as to define a recessed space 26 beneath the skillet 14. It is appreciated that the rails 20 in this configuration provide rolling engagement between the skillet 14 and workstations 16, which increases system efficiency by reducing friction loss during translation. Within the recessed space 26 of at least a portion of the workstations 16 at least one novel lift element 28 is securely positioned at a predetermined first location. For example, in the illustrated embodiment the element 28 is positioned at the entry of each station requiring elevation change.

Each skillet 14 includes a frame 30, and a working platform 32. At least a portion of the skillets 14 further include a vertically translatable table 34 relative to the frame 30 (FIG. 2). The table 34 is translatable between the desired work elevation and a home position (compare, FIGS. 3 and 5). As such, each lift skillet 14 further includes a modifiable apparatus 36 integrated with the table 34 and skillet platform 32. The apparatus 36 is re-configurable so as to change its height relative to the frame 30 and lockable in a plurality of load bearing configurations. The apparatus 36 presents a sufficient rating and capacity range relative to the anticipatory loads to be lifted. Finally, each lift skillet 14 further includes a novel device 38 configured to mechanically engage the element 28, when the skillet 14 enters the workstation 16.

The device 38 and element 28 are cooperatively positioned relative to the skillet 14 and station 16, and configured to drive the lifting mechanism during a first engagement period. To that end, the device 38 is coupled to and operable to change the configuration and then lock the apparatus 36 in a new configuration. More preferably, the device 38 and element 28 are cooperatively configured to mechanically convert the translation of the skillet 14 into a change in table elevation, when the two are tangibly engaged. Finally, the device 38 and element 28 are preferably configured so as to provide mechanical advantage during the conversion.

Figure 6:
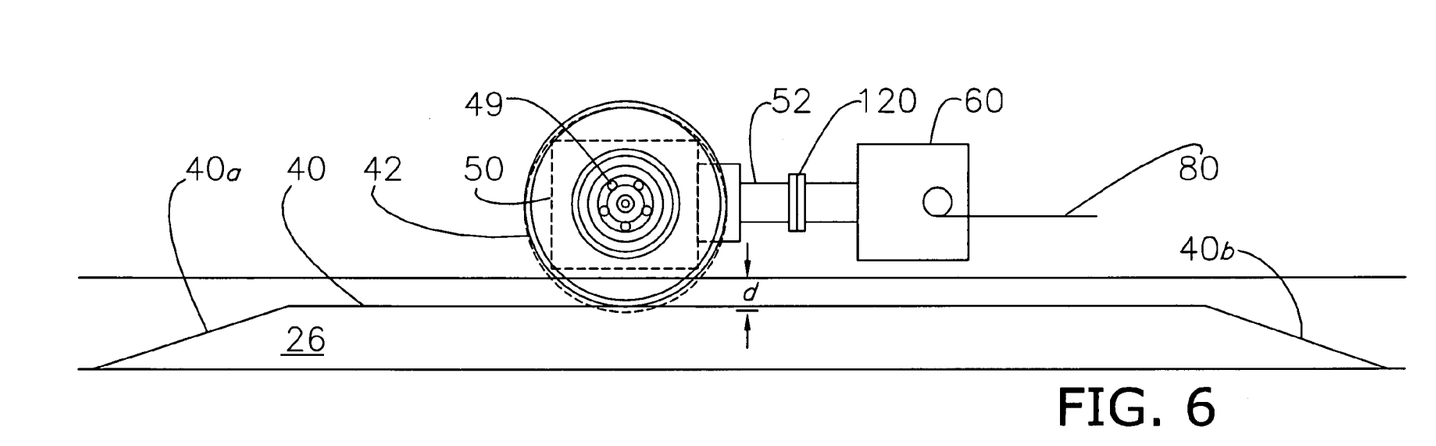
FIG. 6 is a schematic side elevation view of a skillet lift device including a friction wheel and a workstation lift element presenting a surface in accordance with a preferred embodiment of the invention.

In one embodiment, the device 38 and element 28 cooperatively present a textured surface 40 and a friction wheel 42 that engages and is caused to be rotated by the surface 40 (FIG. 6), when the skillet 14 enters the workstation 16. The element 28 may present an elevated textured surface having a predetermined longitudinal length and a first end 28a positioned at a desired starting point within the workstation, as shown in FIGS. 2 and 6. The surface 40 preferably includes ramp up and down sections 40a,b from the base support, so as to facilitate gradual engagement. As shown in FIG. 6, the friction wheel 42 projects within the space 26 a distance, d. The elevation of the surface 40 and d are cooperatively configured such that the device initially engages the ramp up 40a, and causes the wheel 42 to be compressibly engaged with the surface 40. The translation of the skillet 14 is mechanically converted into the change in table elevation by the rotation of the wheel 42, and mechanical advantage is provided based in part upon the radius of the wheel 42. In this configuration, it is appreciated that the coefficient of kinetic friction between the wheel 42 and surface 40 must exceed a minimum threshold proportional to the weight of the object 12, so that sliding does not occur.

In another embodiment, the device 38 and element 28 cooperatively present a rack 44 and a pinion gear 46 that engages and is caused to be rotated by the rack 44. Similar to the wheel 42 and surface 40, the translation of the skillet 14 is mechanically converted into lifting force through the rotation of the pinion 46. The length of the rack 44 determines the elevation change; there is no operator intervention to alter the elevation. In this configuration, d is preferably selected to solely mesh the teeth of the pinion gear 46 and rack 44.

Figure 7:
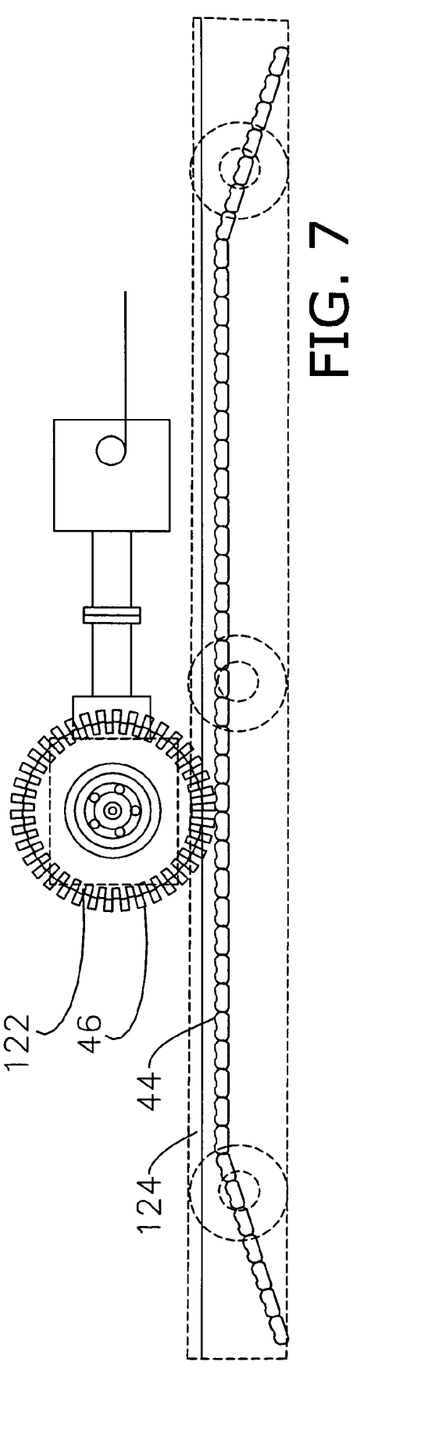
FIG. 7 is a schematic side elevation view of a skillet lift device and workstation lift element cooperatively presenting a rack and pinion gear configuration, and a second gear and chain for aligning the rack and pinion gear, in accordance with a preferred embodiment of the invention.
Figure 8:
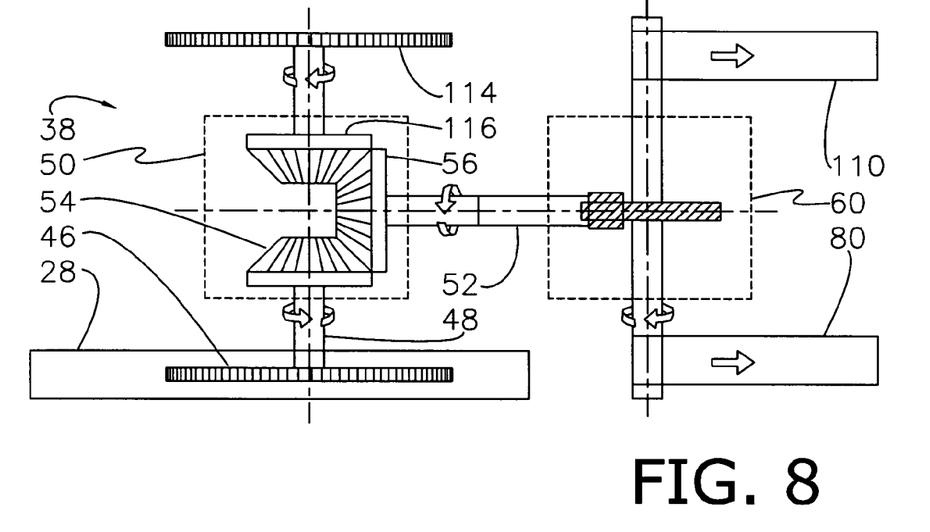
FIG. 8 is a schematic plan view of a skillet lift device including first and second pinion gears, a first lateral axle, a first gear box, a longitudinal shaft, a second gear box, and a second lateral axle, engaging a workstation lift element, so as to unwind first and second belts about the second axle.

In either the rack and pinion or friction wheel configurations, the device 38 further includes a first lateral axle 48 attached to the center of the wheel 42 or pinion 46 and a gear box 50 configured to transfer the rotational energy of the first lateral axle 48 to a longitudinal shaft 52. As shown in FIGS. 6 and 7, all pivots and rolling points, including the first axle support, preferably have anti-friction bearings 49 for increased efficiency. As shown in FIG. 8, the first axle presents a lateral axis of rotation, and the longitudinal shaft 52 defines an axis parallel to the direction of translation. As such, gear box 50 is configured to orthogonally redirect the rotational energy and drive force contributed by the side pusher drive 18, and may include drivenly coupled spiral bevel gears 54,56 (FIGS. 8 and 9).

The device 38 may be configured such that the longitudinal shaft 52 is interconnected to and directly causes the reconfiguration of the apparatus 36. For example, the apparatus 36 may be central screw actuated, wherein a ball screw frictionlessly converts the rotational energy of the longitudinal shaft 52 into the vertical translation of the table 34. Alternatively, a conventional accordion or spiral type apparatus 36 may be interconnected to and driven by the longitudinal shaft 52.

Figure 9:
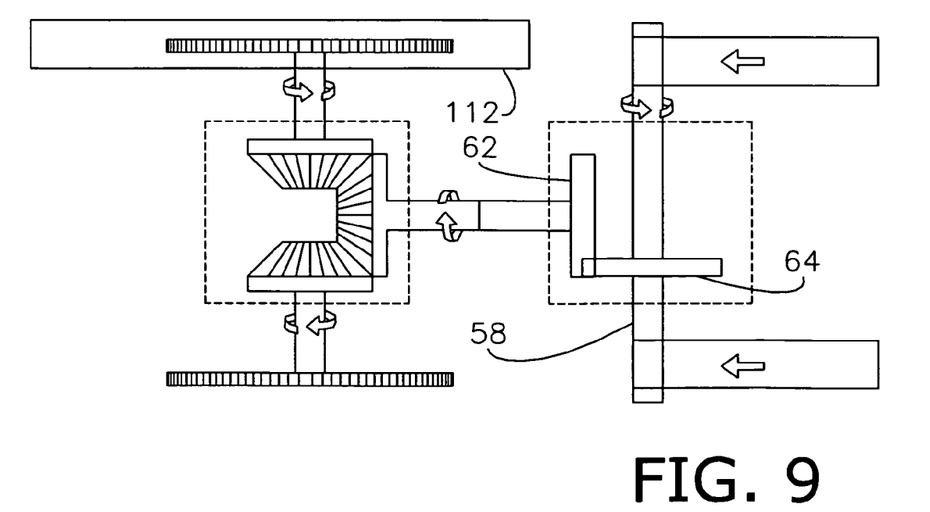
FIG. 9 is a schematic plan view of a skillet lift device including first and second pinion gears, a first lateral axle, a first gear box, a longitudinal shaft, a second gear box, and a second lateral axle, engaging a workstation lift element, so as to wind first and second belts about the second axle.

In the illustrated embodiment, however, the longitudinal shaft 52 is preferably coupled to a second lateral axle 58 through a second gear box 60 (FIGS. 8 and 9). To re-direct the axis of rotation, like gear box 50, gear box 60 includes at least first and second orthogonally oriented gears 62,64 (FIG. 9). Where a step down in rotational displacement (and the resultant increase in output force) is desired, box 60 may present a conventional gear reducer plus mechanical brake that acts upon the input of the longitudinal shaft 52. Helical gear teeth are preferably utilized to improve efficiency and reduce noise. More preferably, where a greater step is desired, the longitudinal shaft gear 62 preferably presents a worm gear, as generally shown in FIG. 8. In this configuration, the shallow pitch depth of the worm gear 62 provides the added benefit of serving as a locking feature as it is appreciated that the lateral axle gear 64 cannot reversibly turn the worm gear 62. As a result, box 60 further acts as a brake for the lift when the skillet 54 is not translating. Thus, through gear boxes 50 and 60 and longitudinal shaft 52, the first lateral axle 48 is drivenly coupled to the second lateral axle 58.

Figure 10:
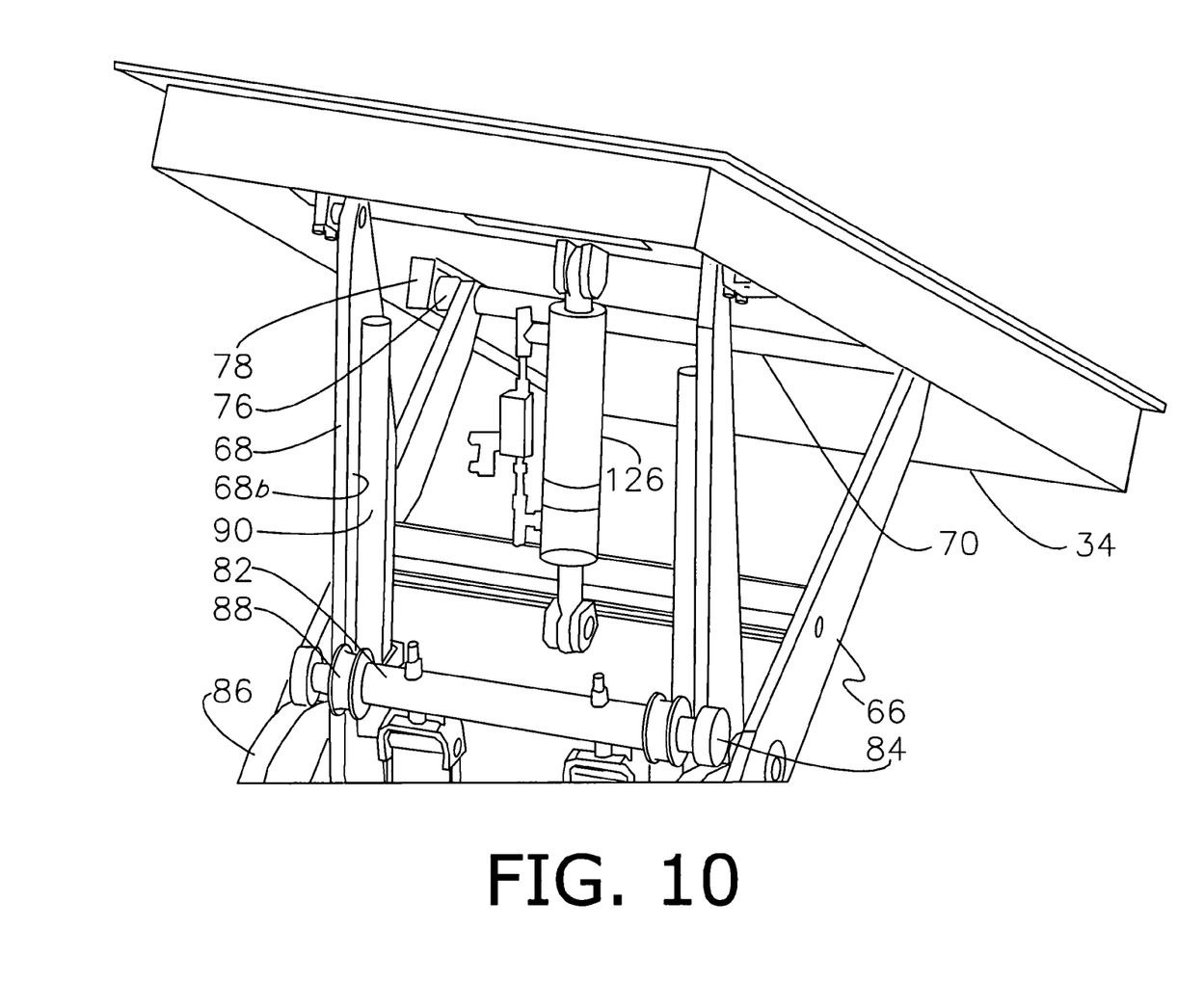
FIG. 10 is an enlarged perspective view of a skillet table, floating member, first and second belts connected to the member, and an uppermost portion of a scissor apparatus, in accordance with a preferred embodiment of the invention.

In the illustrated embodiment, the reconfigurable skillet apparatus 36 is of the type defining a collapsible scissor. The scissor 36 is securely coupled to the table 34 at an uppermost or distal end defined by first and second pairs of parallel legs 66,68. Likewise, the scissor 36 is securely coupled to the frame 30 at a platform end opposite the distal or table end. The pairs of legs 66,68 traverse each other and are interconnected, so as to be uniformly translated, by a plurality of cross bars. As shown in FIG. 2, the first and outer pair 66 is interconnected at or near their upper end 66a by a crossbar 70 that is translatably coupled to the table 34. More particularly, crossbar 70 presents circular end members 76 that rollingly engage raceways 78 defined by the table 34 (FIG. 10). The raceways 78 are longitudinally configured to enable a full range of motion between table home and desired work elevation positions, and laterally to provide only a single degree of freedom. The second and inner pair of legs 68 are interconnected at or near their lowermost ends 68a by a lowermost crossbar 72 that is translatably coupled to the skillet frame 30 (FIG. 2) similar to crossbar 70.

Figure 11:
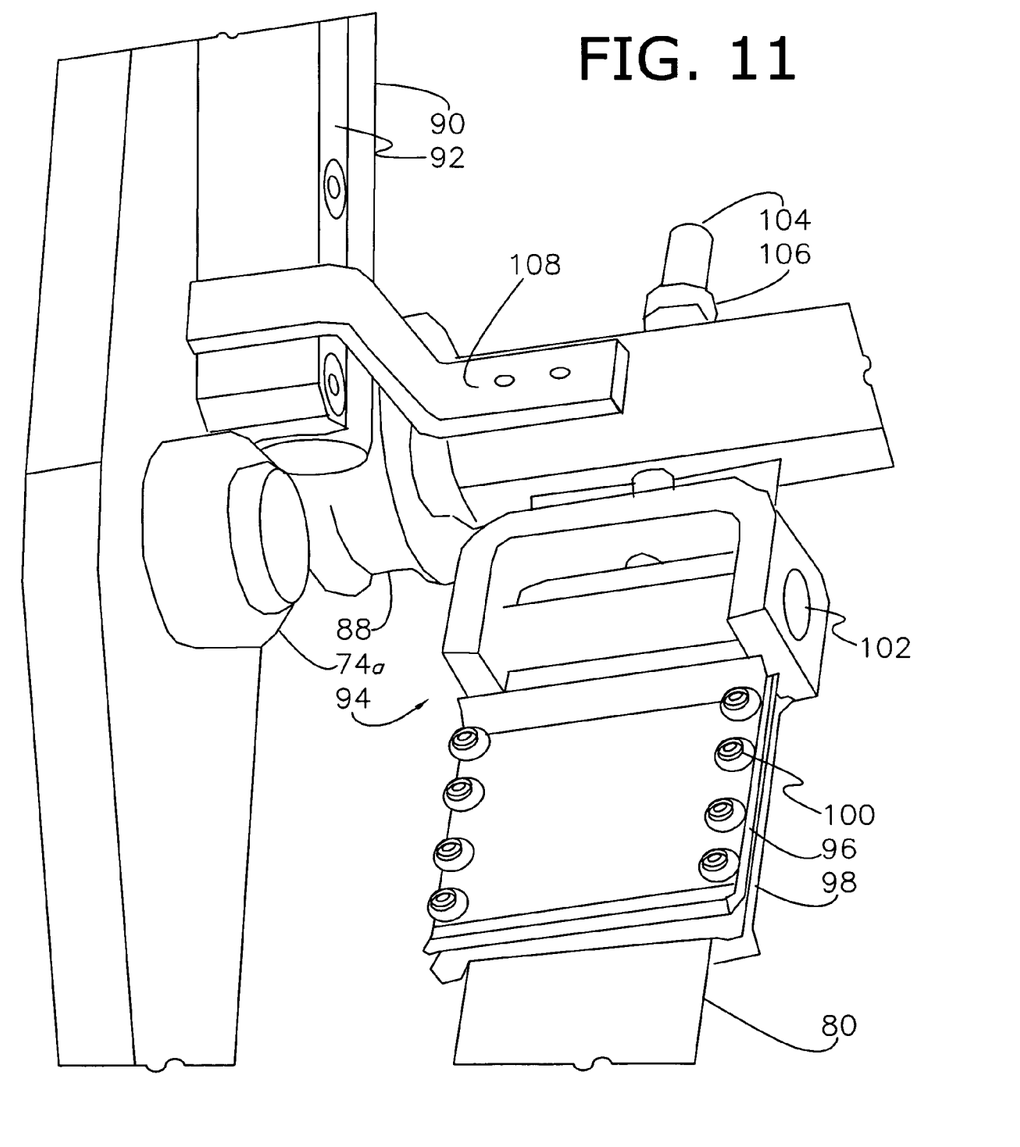
FIG. 11 is an enlarged perspective view of a U-shaped bracket in accordance with a preferred embodiment of the invention, particularly illustrating the interconnection of the belt and floating member by the bracket.

The legs 66,68 may be further interconnected by a main crossbar 74 at their longitudinal centers (FIG. 2). More preferably, however, two pin connections 74a are provided in place of crossbar 74 (FIG. 11). The opposite end of the first pair of legs 66 is translatably fixed but rotatably coupled to the frame 30 at or near the second lateral axle 58, and the opposite end of the second pair 68 is translatably fixed but rotatably coupled to the table 34. The configuration of the scissor apparatus 36 enables it to collapse when the translatable leg ends 68a near the platform 32 are caused to travel outward and away from the device 38, and rise when they are caused to travel inward. As the apparatus 36 collapses or rises the table elevation changes.

The device 38 is drivenly coupled to and operable to cause the apparatus 36 to collapse or rise. To that end, in the illustrated embodiment, the device 38 includes at least one belt 80 that is fixedly attached to the second lateral axle 58 and apparatus 36. Wherein the lowermost crossbar 72 defines device and rearward facing surfaces 72a, b, the belt 80 passes beneath crossbar 72 and is oriented so as to overlay the rearward surface 72b (FIGS. 3-5) prior to connecting to the apparatus 36. The belt 80 is connected to the apparatus 36 at a lateral member above crossbar 72. Thus, in this configuration, when lateral axle 58 is rotated so as to cause the belt 80 to wind about its axis and the interconnecting belt length to reduce (FIG. 9), the lower crossbar 72 is caused to travel towards the device by the force exerted upon the rearward surface 72b by the belt 80.

Figure 5:
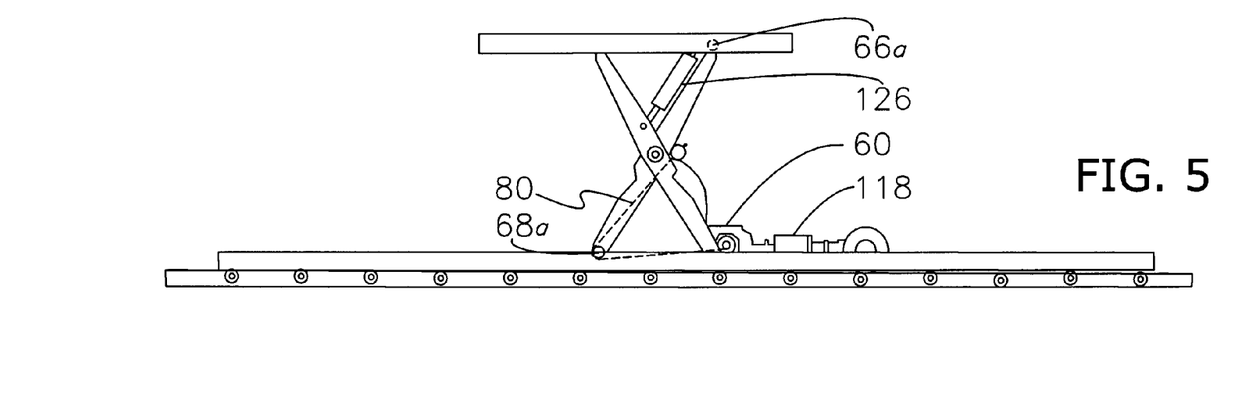
FIG. 5 is a side elevation view of the skillet shown in FIGS. 3 and 4, particularly illustrating the lift in a desired table elevation condition.

More preferably, the belt 80 is rotatably connected to the apparatus 36 at a floating lateral member 82 (FIGS. 3-5, 10 and 11). As best shown in FIG. 10, the member 82 presents a lateral width greater than the spacing of inner legs 68 and equal to the spacing of outer legs 66, and is positioned on the device side of the legs 66,68 so that the tensioned belt 80 exerts a holding force between the member 82 and legs 66 causing the member 82 to be retained at a generally fixed vertical elevation. At the desired work elevation, the height of the member 82 is preferably along the vertical midline of the scissor apparatus 36, as shown in FIG. 5. The member 82 defines circular end caps 84 that rotatably engage the outer legs 66 during lifting. More preferably, adjacent the vertical midline, outer legs 66 further define parabolic cam sections 86 that engage the caps 84 during lifting. The cam sections 86 are configured such that the vertical elevation of the member 82 is generally held constant during an initial portion of a collapsing scissor event. It is appreciated that this configuration provides a more gradual load bearing profile by maintaining the linear relationship between the constant translation drive force and the tension in the belt 80.

More preferably, floating member 82 further defines opposite radially concave sections 88 and the apparatus 36 includes first and second cylindrical tube sections 90 fixedly secured to the interior surfaces 68b of the inner legs 68 (FIG.

10). For example, the tube sections 90 may be fixedly attached to the legs 68 by a back support 92, as shown in FIG. 11. The concave sections 88 are configured to mate and rollingly engage the tube sections 90 as the floating member is translated up the apparatus 36, and are therefore rotatably coupled to the remainder of member 82. As such, the sections 88 are spaced from the end caps 84 a distance equal to the width of legs 68.

The belt 80 is attached to member 82 so as to ensure a secure interconnection having a tensile load failure strength not less than that of the belt 80. In the illustrated embodiment, for example, a "U"-shaped bracket 94 is provided for fixedly interconnecting the belt 80 to the member 82 (FIG. 11). The bracket 94 includes clamping plates 96,98 that are brought to impress a distal belt end section intermediately posed therebetween. A plurality of fasteners 100 cooperatively secure the plates 96,98 and apply a holding force to the belt 80. A bar 102 receives the belt prior to interposition within the plates 96,98. Finally, the bracket 94 further includes a fastener 104 for retaining the bracket and belt end in a fixed position relative to the floating member 82. As illustrated, the fastener 104 may present a main bolt threadably receivable within a tapped hole defined by the member 82. Lock nut 106 is threadably receivable by the bolt once inserted and operable to hold the bracket 94 in place.

Also shown in FIG. 11, the preferred apparatus 36 further includes angled braces 108 fixedly attached near opposite ends of the floating member 82 and rolling concave sections 88. The braces 108 are configured to further retain the floating member 82 in a fixed condition adjacent the tube section 90. It is appreciated that the braces 108 are not fixedly attached to the tube sections 90, so that the member 82 is able to longitudinally translate along the sections 90.

It is appreciated that the belt 80 consists of material having a tensile strength not less than the maximum anticipatory load to be lifted. More preferably, the belt 80 is formed of material having a tensile strength greater than twice the maximum load. For example, where the objects 12 are vehicle frames presenting anticipatory weights not greater than 2000 lbs (i.e., 8900 newtons), the belt 80 is preferably formed of a composite steel belt material having a rated belt tensile strength of 4000 lb/ft. Load bearing and drive members of the device 38, such as the axles, shaft, and gears 48-64 and the scissor apparatus 36 are preferably formed of high strength steel.

In a preferred embodiment, a second identical belt 110 is provided for redundancy and is similarly interconnected to the second lateral axle 58 and floating member 82, as shown throughout the illustrated embodiment. Alternatively, it is also appreciated that a chain or reinforced cable may be used in addition to or lieu of the belts 80,110.

In a preferred embodiment, the preferred system 10 includes a second workstation lift element 112 positioned and configured to automatically engage the device 38 during a second engagement period after the first. The second element 112 and device 38 are cooperatively configured to reconfigure the apparatus 36 so as to again change the table elevation, and more preferably return the table 34 to its home position. That is to say, the first and second lift elements 28,112 are staggered, such that once the object 12 has been lifted to the desired elevation, the task performed, and skillet translation recommenced, the object 12 is lowered to a safer travel position prior to leaving the workstation 16.

In the illustrated embodiment, the second element 112 presents a second elongated rack (or textured surface). The device 38 includes a second pinion gear (or friction wheel) 114 spaced from the first 46 so as to be on opposite sides of the longitudinal shaft 52. The second pinion 114 is fixedly connected to the first lateral axle 48 so as to further drive gear box 50. In this configuration, box 50 includes a third bevel gear 116, as shown in FIGS. 8 and 9. As a result of the diametrically opposite positioning of the pinions 46,114, a selected direction of rotation in the longitudinal shaft 52 is produced dependent upon which pinion is engaged. The second axle 58 rotates clockwise or counter-clockwise to wind or unwind the belts 80,110 based on the selected direction (compare, FIGS. 8 and 9).

In a preferred embodiment, an irreversible lock 118 engages the longitudinal shaft 52, and is operable to prevent the longitudinal shaft from rotating in the non-selected direction. For example, the irreversible lock 118 may be of the type conventionally utilized to automatically lock adjusting mechanisms. It is appreciated that the lock 118 enables the longitudinal shaft 52 to be driven in either direction of rotation without hindrance, while a locking effect is exerted to prevent any torque in either direction from acting in reverse.

In a preferred embodiment, a slip clutch 120 may comprise the longitudinal shaft 52. The slip clutch 120 is operable to prevent the longitudinal shaft 52 and therefore the system 10 from becoming over-burdened by load. The clutch 120 is configured to fail (or "slip") when the load exceeds a predetermined maximum threshold based on the anticipatory load and tensile strength of the belt 80.

In a preferred embodiment, the device 38 further includes a companion gear 122 preferably adjacent the first pinion gear 46, and the system 10 includes a roller chain 124 oriented and configured to engage the companion gear 122 during translation (FIG. 7). The companion gear 122 and chain 124 are cooperatively configured to guide the skillet 14 as it translates, so that the pinion gear 46 is aligned with the rack 44 of the approaching station 16.

In a preferred embodiment, the system 10 further includes an anti-fall member 126 for preventing inadvertent scissor collapse. For example, as shown in FIG. 11, a pneumatic cylinder 126 may be interconnected to the table 34 and apparatus 36. The cylinder 126 is configured to present a counteractive force against the direction of collapse, so that during a failure event the cylinder serves as a back up holding mechanism or decelerator. Alternatively, a saw-tooth bar (not shown) that engages one or more of the gears could also serve as an anti-fall or locking mechanism.

Figure 12A:
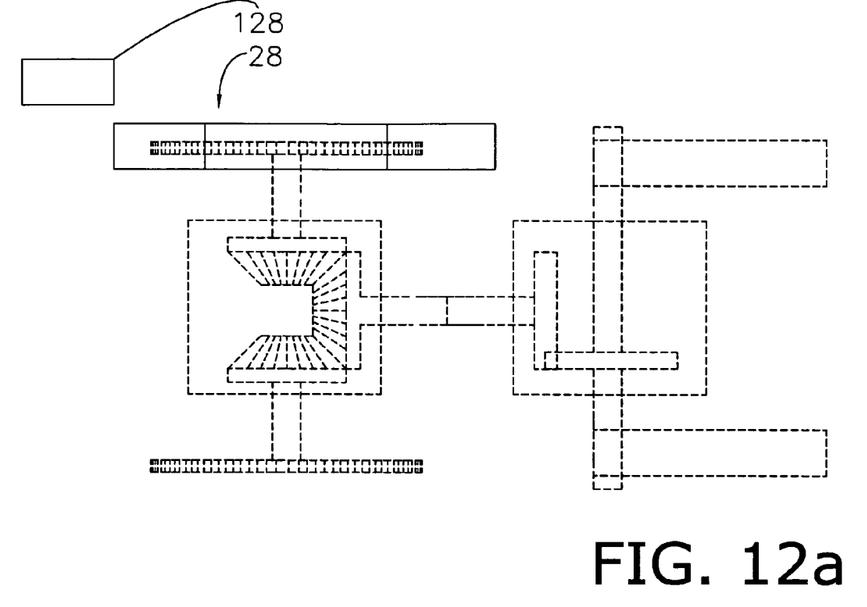
FIG. 12a is a schematic plan view of a workstation lift element comprised of removably interconnected segments, in accordance with a preferred embodiment of the invention.
Figure 12B:
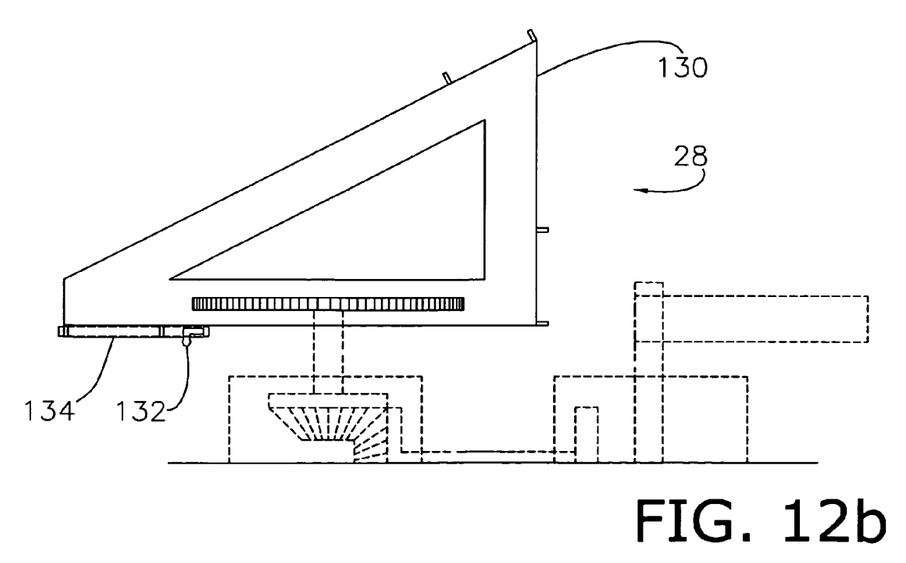
FIG. 12b is a schematic plan view of a workstation lift element presented by a side of a polygon having sides of differing lengths, in accordance with a preferred embodiment of the invention.

Finally, in a preferred embodiment, the element 28 is adjustable so as to modify the quantity of change in table elevation within a workstation 16. For example, the element 28 may comprise a plurality of removably interconnected segments 128 of equal or differing lengths, wherein each segment 128 may be removed or new segments may be added, in order to change the overall length of the element 28 (FIG. 12a). Once added, the segments 128 are fixedly secured to prevent inadvertent dislodgment, misalignment, gaps, or slippage. Alternatively, the element 28 may present an integral structure that is reconfigurable so as to change the engagement length. For example, the element 28 may present one side of a polygon 130 having sides of differing lengths, wherein the polygon 130 is rotatable within the space 26 to one of a plurality of orientations that result in engagement between the device 38 and a respective side. Once desirably oriented, the polygon 130 is fixedly secured by a locking mechanism, such as for example, by a bar 132 and sleeves 134, as shown in FIG. 12b.

It is appreciated that suitable makes and models of drive mechanism components, and unmodified structural skillet parts are readily determinable by those of ordinary skill in the art without undue experimentation, and as such have not been further described herein. The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to determine and assess the reasonably fair scope of the present invention as it pertains to any apparatus, assembly, or method not materially departing from but outside the literal scope of the invention as set forth in the following claims.

What is claimed is:

1. An autonomous skillet lift adapted for use with a workstation, and with a skillet having a frame and a vertically translatable table relative to the frame, wherein the skillet is translatable through the workstation so as to define a translation, said lift comprising:
    at least one elevation adjustment element securely positioned at a first location within the workstation; and
    an elevation adjustment device fixedly connected to the skillet, drivenly coupled to the table, and configured to engage the element for an engagement period during the translation,
    said element and device being cooperatively configured to mechanically convert the translation of the skillet into a predetermined change in table elevation during the engagement period, wherein the element includes an adjustable longitudinal length and the change in table elevation is controlled by adjusting the longitudinal length of the element.

2. The lift as claimed in claim 1, wherein the element and device are cooperatively configured to provide mechanical advantage during conversion.

3. The lift as claimed in claim 1, wherein the element and device cooperatively present a textured surface and a friction wheel that engages and is caused to be rotated by the surface, and the translation is mechanically converted into the change in elevation due to the rotation of the wheel.

4. The lift as claimed in claim 1, wherein the element comprises a plurality of removably interconnected segments, and said segments are removable so as to change the longitudinal length of the element.

5. The lift as claimed in claim 1, wherein the element is presented by one side of a polygon having sides of differing lengths, and the polygon is repositionable such that another of said sides presents the element.

6. The lift as claimed in claim 1, wherein element and device cooperatively present a rack and a pinion that engages and is caused to be rotated by the rack, and the translation is mechanically converted into the change in elevation due to the rotation of the pinion.

7. The lift as claimed in claim 6, wherein the device includes a companion gear, the element includes a roller chain oriented and configured to engage the companion gear during the translation, and the companion gear and chain are cooperatively configured to align the pinion and rack.

8. The lift as claimed in claim 6, wherein the skillet includes a collapsible scissor apparatus securely coupled to the table and including a first pair of legs presenting a first end vertically fixed by and longitudinally translatable relative to the frame, the pinion is drivenly coupled to and operable to cause the first end of the legs to translate relative to the frame, and the change in elevation is caused by the translation of the legs.

9. The lift as claimed in claim 8, wherein the pinion is drivenly coupled to the legs by a first lateral axle connected to the pinion, a longitudinal shaft, and a first gear box configured and operable to receive rotational input from the first lateral axle and produce a selected direction of rotation in the longitudinal shaft.

10. The lift as claimed in claim 9, wherein an irreversible lock engages the longitudinal shaft, and is operable to prevent the longitudinal shaft from rotating in the non-selected direction.

11. The lift as claimed in claim 9, wherein a slip clutch comprises the longitudinal shaft, and is operable to prevent the longitudinal shaft from transmitting a load greater than a maximum threshold.

12. The lift as claimed in claim 9, wherein the legs are spaced and interconnected by a cross-bar defining pinion and rearward faces, the pinion is drivenly coupled to the legs by a second lateral axle, a second gear box configured to receive input from the longitudinal shaft and produce a selected direction of rotation in the second axle, and a first belt having a first end coupled to the skillet and a second end spaced from the first end by a belt length and coupled to the second axle so as to be wound or unwound thereby, said belt adjacently engaging a portion of the rearward face of the cross-bar, such that when the belt length is reduced the belt imparts a translation force to the cross-bar.

13. The lift as claimed in claim 12, wherein the table bears a maximum load upon the scissor apparatus, the first belt presents a tensile strength greater than the maximum load, and the pinion is further drivenly coupled to the legs by a second redundant belt also presenting a tensile strength greater than the load.

14. The lift as claimed in claim 12, wherein the second gear box receives an input of force and includes a step down in rotational displacement, so as to produce an output of force greater than the input.

15. The lift as claimed in claim 9, wherein the device includes a ball screw configured to convert the rotational motion of the longitudinal shaft into the linear translation of the table.

16. An autonomous skillet lift adapted for use with a workstation and a skillet having a frame and a vertically translatable table relative to the frame, wherein the skillet is translatable through the workstation so as to define a through-station translation, said lift comprising:
    first and second elevation adjustment elements securely positioned at first and second respective locations within the workstation;
    an elevation adjustment device fixedly connected to the skillet, drivenly coupled to the table, and configured to asynchronously engage each element during the translation,
    said elements and device being cooperatively configured to mechanically convert the translation of the skillet into predetermined first and second changes in table elevation during engagement;
    said device including a first pinion and a second pinion, each rotatable in response to the longitudinal translation of the device relative to the element, wherein the device further includes a longitudinal shaft intermediate and drivenly coupled with the first and second pinions, the shaft being caused to rotate in a selected clockwise or counterclockwise direction depending upon which pinion is engaged, wherein the first change in table elevation achieves a desired table elevation position, and the second change in table elevation returns the table to a home position.

17. The lift as claimed in claim 16, wherein the elements present first and second racks, whereby the first and second pinions engage and are caused to be rotated by the racks, and the translation is mechanically converted into the first and second changes in elevation due to the rotation of the pinions.

18. A multi-elevation conveyor assembly system comprising:
    a plurality of workstations each presenting a desired work elevations, at least a portion of said plurality of workstations including at least one elevation adjustment element securely positioned at a first location within the workstation;
    a plurality of skillets each including a frame, a portion of said skillets further including a vertically translatable table relative to the frame, wherein said table is translatable between each of the work elevations and a fully recessed position, and a device configured to engage the element of the respective station for an engagement period, during the translation; and
    a translation drive operable to cause a translation of each skillet through a respective workstation,
    said pluralities of workstations and skillets being cooperatively configured such that said each of at least a portion of the skillets concurrently engage the respective stations,
    each of said element and device being cooperatively configured to mechanically convert the translation of the skillet into a predetermined change in table elevation equal to the desired work elevation, during the engagement period;
    wherein each of the at least one elevation adjustment element includes an adjustable longitudinal length, with the change in table elevation controlled by adjusting the longitudinal length of the at least one elevation adjustment element; and
    the device including a first pinion and a second pinion, each rotatable in response to the longitudinal translation of the device relative to the at least one elevation adjustment element, wherein the device further includes a longitudinal shaft intermediate and drivenly coupled with the first and second pinions, the shaft being caused to rotate in a selected clockwise or counterclockwise direction depending upon which pinion is engaged to raise or lower the skillet respectively.

* * * * *